May 7, 1963  H. W. CHRISTENSON ETAL  3,088,552
SERVO-TYPE DISC BRAKE
Original Filed April 30, 1956
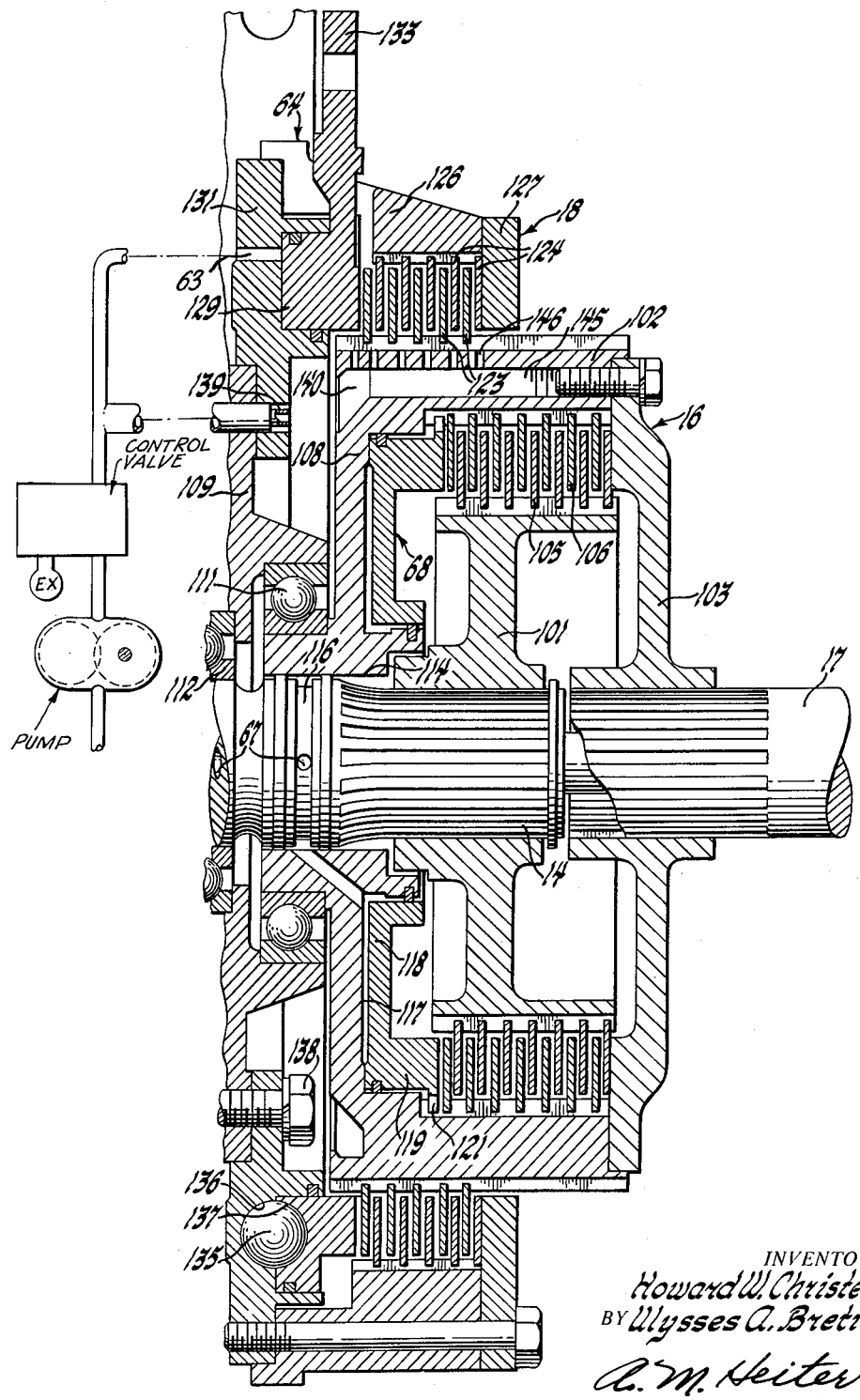
INVENTORS
Howard W. Christenson &
BY Ulysses A. Breting
A. M. Heiter
ATTORNEY

United States Patent Office 3,088,552
Patented May 7, 1963

3,088,552
SERVO-TYPE DISC BRAKE
Howard W. Christenson and Ulysses A. Breting, Indianapolis, Ind., assignors to General Motors Corporation, Detroit, Mich., a corporation of Delaware
Original application Apr. 30, 1956, Ser. No. 581,654, now Patent No. 2,941,639, dated June 21, 1960. Divided and this application Apr. 18, 1960, Ser. No. 22,804
1 Claim. (Cl. 188—72)

This invention relates to a transmission and more particularly to a transmission having a clutch and a brake mechanism. This application is a division of the applicants' prior application Serial No. 581,654, filed April 30, 1956, which has matured into Patent No. 2,941,639.

This transmission assembly is particularly adapted to be employed in a final drive transmission assembly employing similar right and left-hand units as fully explained in the above Patent No. 2,941,639, but may be employed generally to provide a clutch connection between an input and an output shaft and a brake mechanism for the output shaft. The clutch mechanism connects a hub fixed to the input shaft and a housing fixed for rotation with the output shaft and surrounding the input hub. The input and output shafts and the output housing are rotatably supported on the fixed transmission housing. An annular piston located within the output housing is actuated by fluid under pressure to engage a plurality of clutch plates or a friction engaging device to connect the input hub to the output hub. The reaction brake or friction engaging device consists of a plurality of plates splined to the outer cylindrical surface of the output housing and to the fixed transmission housing and is actuated either hydraulically or mechanically. The actuating mechanism for this friction engaging device consists of an annular piston located in an annular cylinder. The adjacent annular surfaces of the cylinder and piston each have a plurality of cam grooves cooperating with cam balls so that rotary movement of the piston in either direction relative to the cylinder moves the piston outwardly in the cylinder in a direction to engage the friction engaging device. Fluid may also be supplied to the piston to hydraulically engage the friction engaging device. The ball ramps and cam balls are arranged to provide movement of the piston in the engaging direction for self-energizing brake application on both mechanical and hydraulic brake operation. The piston on initial brake application engages a friction plate that is rotating in the same direction as the output housing to rotate the piston to actuate the cams to provide self-energizing brake application.

When the brakes are hydraulically engaged, the fluid first moves the piston into engagement with a rotating brake plate which rotates the piston to provide in addition to the hydraulic engaging force a mechanical engaging force due to the rotation of the piston and the action of the cam balls. For mechanical actuation the piston is mechanically rotated by a suitable linkage so that the cam balls initially move the piston into engagement with the rotating brake plate which provides an additional rotating force in the direction of brake application on the piston to provide additional self-energized brake actuation. The cam balls and the cam grooves are located within the cylinder in the space between the piston and cylinder so that they are at all times submerged in the actuating fluid or oil to maintain the cam balls lubricated and free of foreign matter.

An object of the invention is to provide a hydraulically and mechanically operated brake wherein the actuating member is moved either by the hydraulic or mechanical actuation mechanism and on actuation is self-energized by the rotating brake element.

Another object of the invention is to provide a hydraulically and mechanically operated brake wherein the actuating member is moved either by fluid under pressure or mechanical actuation and the mechanical actuation mechanism provides self-energized brake actuation when the brake is actuated by the hydraulic or the mechanical actuation mechanism.

Another object of the invention is to provide a hydraulically and mechanically operated brake wherein the mechanical actuation mechanism is located within the cylinder between the cylinder and piston of the hydraulic actuation mechanism so that the mechanical brake actuation mechanism is at all times submerged in lubricating fluid and shielded from foreign matter.

These and other objects of the invention will be more apparent to those skilled in the art from the following description of the preferred embodiment of the invention illustrated in the accompanying drawing.

The drawing shows a sectional view of the applicants' transmission.

The applicants' novel clutch brake transmission mechanism including the improved hydraulic and mechanically actuated friction actuator for engaging a friction device such as a brake is illustrated in a cross drive transmission assembly. The drawing, illustrating a preferred embodiment of the invention, shows a right-hand clutch brake assembly having the steering clutch 16 and the brake 18. The transmission unit when used in a cross drive assembly would be part of the cross drive transmission shown in Patent No. 2,941,639 where it is driven by a cross shaft 14. When this transmission unit is employed in other transmission assemblies it may be driven by any input or intermediate input shaft 14. The input shaft 14 is connected by splines to the drive hub 101. The driven housing 102 is connected by the driving hub portion 103 to the wheel shaft 17. Clutch 16 has alternate clutch plates 105 connected to the drive hub 101 and intermediate plates 106 connected to the driven housing 102. The housing 102 also has at its inboard side a centering hub 108 rotatably mounted in the transmission housing 109 by the bearing 111. The shaft 14 is rotatably mounted by a ball or roller thrust bearing 112 mounted in the housing 109 and fits within an internal bore 114 in the hub 108. Clutch line 67 extends axially through shaft 14 and radially through radial passages to the transfer groove 116 to the continuation of the line 67 in the housing 108 leading to the annular cylinder 117 formed in the hub 108. An annular piston 118 is reciprocally mounted in the cylinder 117 and has an abutment portion 119 engaging clutch plates 105 and 106 and a spline 121 engaging the splines on the clutch housing 102 so that the piston rotates with the housing. The brake 18 has an alternate series of plates 123 splined to the outer diameter of the housing 102 connected to the wheel shaft 17. The intermediate plates 124 are keyed to the brake portion 126 of the transmission housing 109. The plates 123 and 124 are located between abutment 127 at one end and annular piston 129 at the other end with a fixed plate 124 engaging the fixed abutment 127 and a rotating plate 123 connected to the wheel shaft 17 engaging the piston 129. The piston 129 is reciprocally and rotatably mounted in a cylinder 131 formed in the housing 109. The brake is actuated hydraulically by the fluid supplied by the brake line 63 to the cylinder 131 which moves the piston 129 to initiate engagement of the clutch plates. Since the piston engages the rotating plate 123, it is rotated and due to the complemental cam surfaces 136 in cylinder 131 and cam surfaces 137 in piston 129 coacting with balls 135, a further self-energized brake applying force is provided.

The brake may also be manually actuated by a suitable manual control connected by a linkage (not shown) to the lever 133 which is secured on the piston 129 to rotate the piston 129 in the same direction as the wheel shaft 17 rotates during forward movement. The series of cam balls 135 are located in complementary cam grooves 136 located in the base of the cylinder 131 and cam grooves 137 located in the adjacent end of the piston 129. The cams are arranged so that on movement of the arm 133 to rotate the piston 129 in the direction of rotation of the wheel during the normal forward operation of the vehicle, the cam moves over the cam ball to move the piston 129 to engage the brake plates 123 and 124 to apply the brake. Since piston 129 directly engages one of the rotating plates 123, the one plate rotates the piston to provide self-energizing action.

The brake housing portion 126 is secured to the main transmission housing by a series of bolts 138. One bolt is omitted to provide a passage for the brake line 63 which also supplies brake cooling oil through orifice 139 in a jet to the annular groove 140 which is connected by the axial passages 145 and radial passages 146 to the brake 18. The clutch plates 105—106 are cooled by oil leaking past piston 118 which will submerge the plates and is vented at the splines between hub 103 and shaft 17 or by a suitable aperture in hub 103. If a cooling supply line is used to supply coolant to the clutch, it is connected by passages similar to passages 146 through hub 101 and drained by radial passages (not shown) in housing 102 between passages 145.

The brake actuating mechanism 64 and the clutch actuating mechanism 68 may be used generally to engage friction engaging devices to establish a drive between two shafts at 1:1 or other ratios or to retard the rotation of a shaft. Thus, these operating mechanisms may be employed generally to actuate friction engaging devices to operate clutches and brakes.

The above-described preferred embodiment is illustrative of the invention and as will be appreciated by those skilled in the art is subject to modification within the scope of the appended claim.

We claim:

In a brake, a rotating member mounted for rotation about an axis, a stationary assembly having an annular cylinder located on and facing one side of said rotating member with an annular end wall and internal and external cylindrical side walls located concentrically about said axis and having fixed abutment means including a cylindrical portion having an aperture located externally of said cylinder and a stationary abutment plate located on the other side of said rotating member, a unitary annular piston located in said annular cylinder for axial and rotary movement having cylindrical inner and outer surfaces in sealing cooperation respectively with said inner and outer cylindrical side walls of said cylinder, and one end face facing said annular end wall of said cylinder and an opposite end face facing said rotating member, cam means on said end wall and said end face for moving said piston axially in response to rotary movement of said piston, means to supply fluid under pressure to said cylinder to axially move said piston to engage said opposite end face with said rotating member and actuate said cam means to apply said brake and a manual control lever fixed on said piston on said outer cylindrical surface adjacent said opposite end face extending outwardly past said outer cylindrical wall of said cylinder and through said aperture for manually rotating said piston to actuate said cam means to apply the brake.

References Cited in the file of this patent
UNITED STATES PATENTS

| | | |
|---|---|---|
| 2,014,630 | O'Brien et al. | Sept. 17, 1935 |
| 2,240,219 | Lambert | Apr. 29, 1941 |
| 2,303,710 | Sinclair | Dec. 1, 1942 |
| 2,373,572 | Lambert | Apr. 10, 1945 |
| 2,471,858 | Bloomfield | May 31, 1949 |
| 2,633,941 | Zindler | Apr. 7, 1953 |
| 2,781,106 | Lucien | Feb. 12, 1957 |
| 2,879,867 | Rike | Mar. 31, 1959 |